May 3, 1966            M. C. FERNANDEZ            3,249,942
SYSTEM AND DEVICE TO FACILITATE NAVIGATION BASED
ON CONTINUOUS RADIO LOCATION FOR AIRCRAFT
Filed June 27, 1962                                                     4 Sheets-Sheet 1

INVENTOR.
MANUEL CASTRO FERNANDEZ
ATTORNEY.

INVENTOR.
MANUEL CASTRO FERNANDEZ
ATTORNEY.

May 3, 1966  M. C. FERNANDEZ  3,249,942
SYSTEM AND DEVICE TO FACILITATE NAVIGATION BASED
ON CONTINUOUS RADIO LOCATION FOR AIRCRAFT
Filed June 27, 1962  4 Sheets-Sheet 4
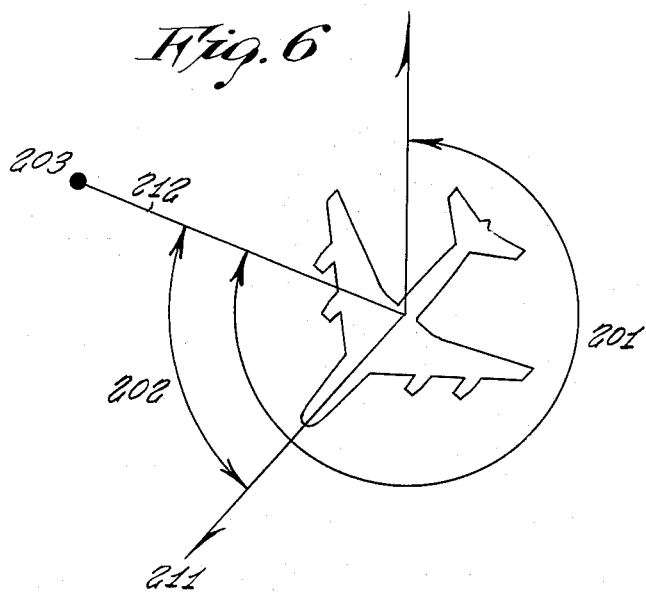
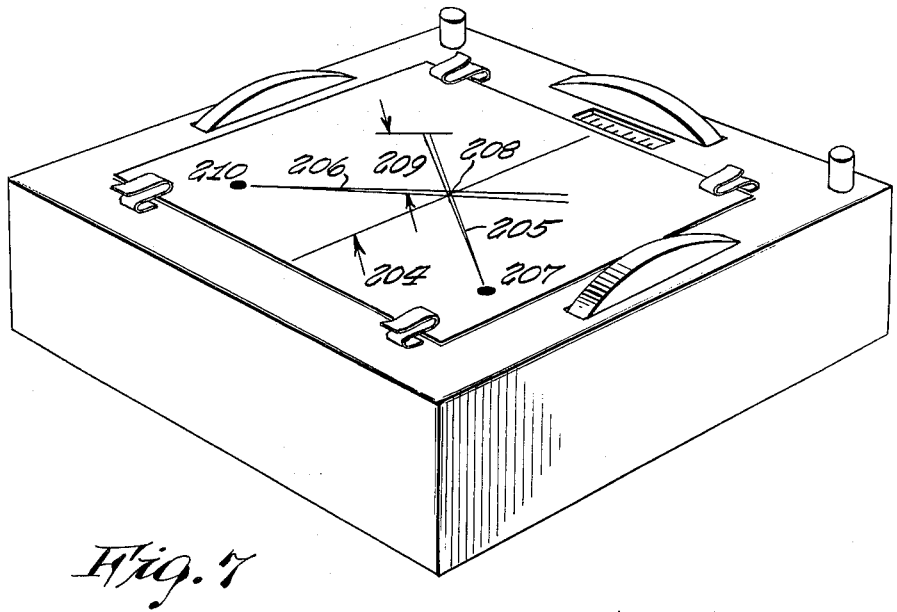
MANUEL CASTRO FERNANDEZ
INVENTOR.
BY *[signature]*
*ATTORNEY*

United States Patent Office 3,249,942
Patented May 3, 1966

3,249,942
SYSTEM AND DEVICE TO FACILITATE NAVIGATION BASED ON CONTINUOUS RADIO LOCATION FOR AIRCRAFT
Manuel Castro Fernandez, Madrid, Spain, assignor of fifty percent to Carlos C. Goetz, Lisbon, Portugal
Filed June 27, 1962, Ser. No. 205,609
Claims priority, application Spain, July 5, 1961, 268,810
10 Claims. (Cl. 343—112)

The present invention relates to navigation, and more specificially to a system and means for facilitating navigation based on continuous radio location, for aircraft.

This application is a continuation-in-part of applicant's U.S. Patent No. 3,009,147 dated November 14, 1961, and applicant's U.S. Patent No. 3,099,008 dated July 23, 1963.

The development and practical application of the computing system disclosed in U.S. Patent No. 3,009,147 and U.S. Patent No. 3,099,008 showing on a map or plan the location and displacement of a moving object have proved to be effective in the practical service of navigation. As described therein, this reading is constantly furnished to the pilot on a plan or map.

However, these systems are amenable to improvements which constitute objects of the invention herein wherein the corrective route manipulations are reduced to the visual readings on the indicator map of the zone over which the craft is being piloted and thus correspond to the actual maneuvers of the craft with reference to the ground.

These improvements and objects thus facilitate and afford a continuous visual reading of the moving position along the course guide line, together with a graphic representation of the flight elevation.

This invention distinguishes over those disclosed in my aforementioned patents in that although in these patents the exact geographic position of the craft was shown continuously and automatically in a map display on board the craft, no provision was made in those two patents to show in the same map display, in advance, the intended line of flight or the flight route. The geographic position was obtained through signals from radio ground stations such as ADF, VOR, DME, VORTAC, TACAN, or the like.

Now if the intended flight route is traced on the same map displaying the position of the craft, and placed in the center, from top to bottom and the right side of the map representing the right side of the ground being overflown and the left side of the map representing the left side of the country area being overflown, as herein shown and described, all that is required is to watch on the map display that the position indication coincides with this central line. If the position indication deviates from this central line, then there has been either a navigation or piloting error, or there has been drift due to winds. The correction in such cases is extremely easy because it is merely necessary to swing the craft in the direction of the central line and thereafter to continue watching that the position indications again coincide with the central line.

Inasmuch as in accordance with Patent No. 3,099,008, there is also provision for showing the nose-tail position of the craft, due to drift, there is this additional means of easy control. The nose-tail direction line of the craft coincides with the central line only if there is a no-wind condition or if there is headwind or tailwind. However, if there are side winds, then the nose-tail direction line of the craft will necessarily be at an angle to the central line, but the drift correction will maintain the craft on the central line.

It is therefore a very important object of this invention to provide a means whereby the above described simple visual process, which requires no thought or mathematical calculation, may be achieved.

A further important object of the invention is the provision of means whereby the indicator function is determined solely by geographic location lines, protracted as light beams, emanating from high frequency direction indicating instruments such as VOR (Visual Omni-Range), or TACAN (Radio Bearing and Distance System for Aerial Navigation), from ground radio stations, the location of which is indicated on the map, thus eliminating the necessity of receiving signals from a Gyro Flux Gate, or any other system of magnetic bearing indication.

This inventive concept is particularly distinguished by the capability of so placing the map that it coincides with the terrain and that furthermore the flight route coincides with the vertical line of the screen, which greatly simplifies navigation.

Accompanying this specification are drawings illustrating preferred forms of the invention wherein:

FIG. 6 is a diagrammatic view showing values of bearing with respect to a craft and independent of the heading of the craft, obtained from ground radio beacons or VOR (Visual Omni-Range) stations.

FIG. 7 is a view of the indicator housing in accordance with the instant invention showing a flight direction line associated with the indicator, the intersection of the geographical position lines being shown at a common point therewith and further presenting a graphic representation of the distance and elevation of the plane from a ground radio beacon or station.

Figure 1:
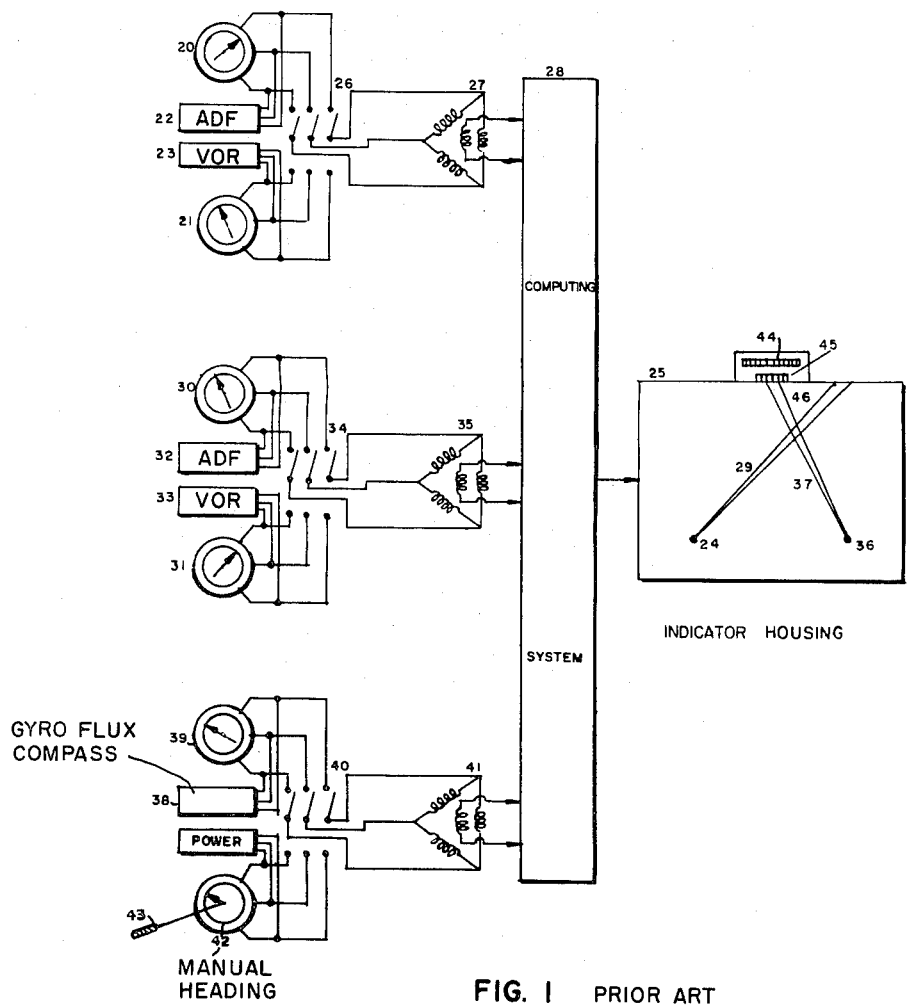
FIGURE 1 is a block diagram taken from applicant's U.S. Patent No. 3,099,008 showing the path of signals received from two ground radio beacon stations and heading compass signal to the computing system, with the indicator housing showing the intersection of the geographical position lines as projected on a map.

Referring now to the drawings in detail, FIG. 1 which represents the system described in U.S. Patent No. 3,099,008, discloses synchronous repeaters 20 and 21 which correspond to an automatic direction finder (ADF) 22 or to the VOR (Visual Omni-Range) 23, that furnish the bearing or the relative bearing from previously synchronized station 24 in accordance with the frequency of the station utilized and which are shown on the map 25. A three-pole switch 26 feeds the stator of another repeater 27 with the signal received from the direction finder or radiogoniometer 22 or from the VOR (Visual Omni-Range) 23 in accordance with the position of the switch 26 and leads them towards the computing device 28 to obtain the geographic position lines 29 projected on the map 25.

An identical system with synchronous repeaters 30 and 31 and a three-pole switch 34 directs the signals from a second radiogoniometer 32 or VOR system 33 towards another repeater 35 which furnishes the bearing or the relative bearing with respect to another synchronized station 36 towards the computing device 28 to obtain a second geographical position line 37 projected on the map 25.

Figure 3:
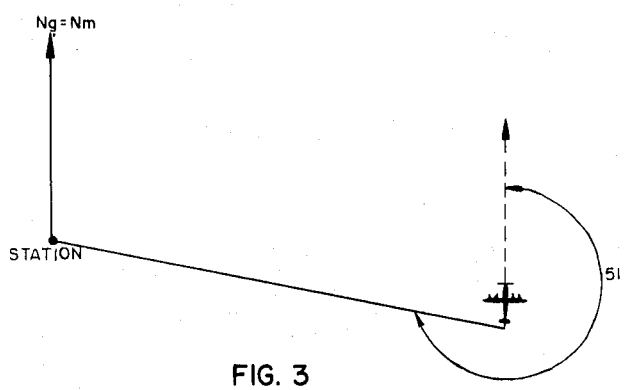
FIGS. 3, 4 and 5 are diagrams of different geographical values integrated in the computing system of the applicant's above mentioned U.S. patents, to obtain the position lines.

When the map or plan extended upon the indicator housing points north towards the upper portion of the indicator and the nose of the aircraft or ship, FIG. 3, points towards true north, and the magnetic variation is nil, the geographical position line 29 or 37 are obtained from the value of the corresponding bearing 51 less 180 degrees.

Figure 4:
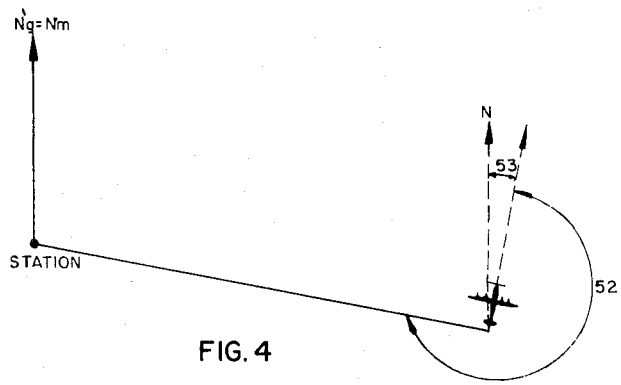

If the map or plan extended upon the indicator housing points north towards the upper portion of the indicator and the nose of the craft or ship, FIG. 4, points in a direction other than true north, that is to say, when there is a certain magnetic course, while the magnetic variation is nil, then the geographical position line 29 or 37 are obtained by the addition of the value of the corresponding relative bearing 52 with the heading value 53, less 180 degrees.

This sum of the magnetic course 53 with the relative bearing 52 given by a navigation receiver can be effected automatically in the computing device 28, if the craft is provided with an electronic compass 38 of any type that will operate a repeater synchronous motor 39 and in a manner similar to those utilized with a direction finder or VOR to introduce the signal in the computing device 28.

When the craft is provided with a synchronous motor 42 of the auto or self-synchronizing type, it is then possible to manually control the value of the heading course of the craft.

When the hand of the manual heading system 43 is moved manually to make it correspond with the reading furnished by the magnetic compass, this rotary movement, by means of an autosyn or selsyn 41 which forms part of the system, introduces into the computing device 28 the same signal that has been introduced by a magnetic compass Flux Gate 38, or the like.

A three-pole switch 40 is provided to switch from the magnetic compass of the Flux Gate type 38 to the manual heading system 42 or vice versa.

If the plane is not equipped with a Flux Gate type of magnetic compass, resort may be had simply to the manual heading system 42, also known as the manual compass which forms part of the computer system described in my U.S. Patent No. 3,099,008, but where the aircraft or vessel is equipped with a Flux Gate 38 type of magnetic compass as shown in FIG. 1 this does not rule out the possibility of using the manual heading system 42 which is an essential and simple emergency control element in the event of damage ot the magnetic compass system of the Flux Gate 38 type.

Figure 5:
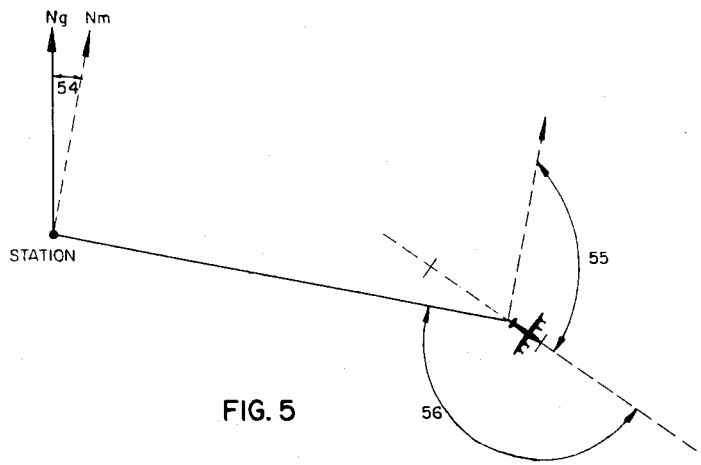

When the map or plan extended upon the indicator housing is pointed north towards the upper portion of the indicator and the nose of the craft or ship, FIG. 5, is pointed in another direction, that is to say when there is a certain magnetic course and furthermore a definite magnetic variation, then the geograhical position line 29 or 37 is obtained by the sum of the magnetic variation 54 plus the value of the heading course 55 plus the value of relative bearing 56 less 180 degrees.

A mechanical addition of the angle of magnetic variation is made so that the bearing 51 or relative bearing 52 or 56 is not subject to this error.

This rectification may be made mechanically by means of a protruding knurled disc 44 mounted on the upper portion of the indicator housing and in proximity to a graduated measuring scale 45.

With the system disclosed in applicant's U.S. Patent No. 3,099,008 using high frequency VOR (visual omnirange) type radio range receivers capable of determining the radial of the ground radio stations generally referred to as the magnetic bearing 201 in a manner independent of the heading of the craft, FIG. 6, the computing system may be located in a reference position for the computation of geographical position lines as is clearly described in the U.S. Patent No. 3,099,008. This reference position is the zero value for the magnetic heading and can be easily obtained as disclosed therein by means of the manual heading system 42 which is capable of remaining indefinitely in the zero position.

Where resort is had to high frequency, VOR type radio range receivers which give the radial of the ground radio station, that is the "bearing" 201 (FIG. 6), there is no need to resort to magnetic compass signals, from a Flux Gate 38, or from a manual compass system 42, in order to obtain the positioning lines 205 and 206; all that is necessary is to position the manual heading or manual compass system 42 at zero degrees permanently, which amounts to maintaining the heading signal at a constant value and independently of the turning of the craft.

These bearing signals 201 (FIG. 6) can be obtained, for instance, from the Omni-Bearing Indicator (OBI) which, as is well known, forms part of the high frequency VOR (visual omni-range) or TACAN (Radio Bearing and distance system for aerial navigation) receiver. This indicator is mounted at a remote site and its readings are not viewed directly, since, on mixing them with the signals supplied by a heading system in a differential selsyn, another instrument known as a Radio Magnetic Indicator (RMI) is actuated, furnishing readings of the relative bearing 202 to the navigator.

The ability to employ these bearing signals 201 in the indicators which show the location, affords an advantage in that it makes it feasible to eliminate entirely the Flux Gate magnetic compass or the like, and to introduce into the computer a more precise signal without any likelihood of errors which are apt to occur in the differential selsyn, and free also from magnetic errors.

The direction finders known as ADF which receive signals from ground stations, that is, signals of low and medium frequency, provide signals known as "relative bearing" 202 (FIG. 6) which represent the angular value between the longitudinal axis of the craft 211 and the straight line 212, which, taking off from the vessel's theoretical center, runs through the point at which the ground radio station 203 is located. Where one operates with signals furnished by these ADF units, or "relative bearing" readings 202, it is necessary to introduce into the computer the signals from the magnetic compass of the Flux Gate 38 type, or from the manual bearing system 42, and the latter must have its pointer positioned at the value given by the simple magnetic compass, as specified in the aforementioned U.S. Patent No. 3,099,-008.

Where high frequency units are employed, the work may be performed at will, either with (1) the "bearing" 201, in which case there is no need for the signals supplied by the magnetic compass of the Flux Gate 38 type, or by the manual bearing system 42, or with (2) the "relative bearing" signal 202, in which case it is necessary to employ the signals furnished by the Flux Gate 38 system, or by the manual system 42. In short, where the work is performed with signals supplied by high frequency receivers of the VOR type, etc., we can employ the "bearing" 201 and dispense with the magnetic compass.

Where the work is performed with a high-frequency VOR station, etc., and another ground station of medium or low-frequency, of the ADF type, we shall require signals of the magnetic compass of the Flux Gate 38 type, or the manual heading system 42, and this also holds true where the work is performed with two low or medium frequency ground stations of the ADF type.

It is extremely simple to switch in the case of a system as described in U.S. Patent No. 3,099,008 from high-frequency to low frequency signals.

A simple switch may be employed for the purpose of cutting in and cutting out the "heading" 201 for the "relative heading" 202 or vice versa, by connecting or disconnecting simultaneously the Flux Gate 38 type magnetic compass, or the manual heading system 42, as desired.

The servomechanism elements 27 and 35 may receive at will some "bearing" signals 201 or "relative bearing" signals 202.

If the map does not show coincidence of its northern direction in exact alignment with the upper part of the indicator, that is, if its north line is not parallel to the line running from top to bottom of the indicator, it is necessary to introduce a correction so as to assure for ourselves an exact reading of its position (location).

Should the map or plan, extended upon said detector housing be pointing north towards the upper portion of the indicator, then no rectification of the angles or geographic position lines 29 and 37 given by the two luminous tracings is required, as the intersection 46 thereof, will at all times indicate the exact position of the craft; however, as on many occasions, plans are utilized wherein the north point does not coincide with the direction of the upper portion of the apparatus, it will then be necessary to effect a rectification of the angles which with respect to the upper portion of the indicator, are given by the two luminous tracings 29 and 37 by adding thereto a supplementary rotation identical to that formed by the north point of the map with the vertical direction of the indicator, that is always known. This rectification, is made mechanically, by means of a knurled disc 44 mounted to the upper portion of the housing 25 and in the proximity of a graduated scale 45 that is applied for the measurement of this rectification.

This correction is clearly specified in my U.S. Patent No. 3,099,008 and the map can be placed in the indicator in any desired geographic or magnetic direction whatsoever, not subject to having the north-south line run vertically in the indicator. The only requirement is that of introducing into the computer system, a respective angular value in keeping with the deviation or inclination of the north-to-south line of the map in relation to the vertical line of the indicator, which is a very simple matter.

Thus it can easily be brought about that the pre-determined flight course 204 should be lodged vertically in the indicator, and preferably centered with respect to its lengthwise axis, so that the flight course should be represented in the indicator in the direction from bottom to top (FIG. 7).

This flight course line 204 will therefore be the center line of the indicator, and it may be drawn on the map proper, on a glass pane, or be formed simply by a wire or in some other similar manner, and placed above or below the map.

This wire line, or one of any other material may be composed of or steeped in a luminescent, fluorescent, phosphorescent or similar material.

Where resort is had to this center line 204 when the signals emanate from high frequency direction indicating equipment such as VOR or TACAN, the only thing the pilot or navigator has to do, is to observe or control to make sure that the intersection of the luminous rays 205 and 206 of the indicator, coincides with the said line 204. The continuous displacement of the luminous rays 205 and 206 in the direction from below upward, and intersecting with the said center line 204, will show in the indicator the displacement of the craft along the terrain shown on the map. When low or medium frequency signals such as ADF, or direction finding receivers, are employed it is necessary to use simultaneous signals from a Gyro Flux Gate, or similar equipment, as in applicant's previous patents.

If in lieu of being on the center line 204, the intersection of the luminous rays falls outside of the said line, say to the left, it provides a visual indication of the fact that the plane has strayed from its course, probably because of drift, and all the pilot has to do is to veer to the right so as to get an intersection of the luminous rays 205 and 206 restored to the center line 204.

This method of verifying and correcting drift is much more practical and simple than a reading by degrees and the respective correction, or than the representation of the lines of drift, as has been done hitherto.

Similarly, distances can be plotted on the projected course center line 204, and by checking the time required by the plane to travel from one marking to the next, a computation is made of the actual rate of speed along the ground, monitoring the observance of the planned schedule, noting readily any delay or outpacing of the schedule.

This graphic representation, which is both continuous and visual, and strictly in correspondence with the flight direction (course line) whereby the actual terrain to the right of the plane corresponds to the side on the right of the center line, and the actual terrain on the left side of the plane, corresponds to the left side of the center line of the map, while the actual terrain ahead of the craft is that which appears in the upper part of the point of intersection 208 of the luminous rays 205 and 206 on the lengthwise center line of the screen 204 from below upward, whereby the flight is completely authentic, allowing of no confusion or errors. Thus the introduction of this center line 204 at the front of the indicator, provides a highly simplified method of solving a large number of problems occurring in navigation.

Hitherto bearing and drift readings have been furnished us by continuous observation of the magnetic compass. Since the observation of the intersection 208 of the luminous rays 205 and 206 on the center line of the navigation indicator 204, is more practical, simple and precise than observation of the magnetic compass, we will be able to relegate the compass from the primary to the secondary position as an emergency and control instrument.

Furthermore, since we no longer require magnetic compass signals for the computer instrument of the luminous rays, if we operate with high-frequency ground stations, such as, for example the VOR, using its "bearing" 201 readings, we shall be perfectly free and independent of the multiple errors and magnetic deviations, which is of considerable advantage, rendering the location system of U.S. Patent No. 3,099,008 more simple, and navigation more precise.

In the system, however, there is no complete elimination of the magnetic compass, owing to the fact that in addition to serving the purpose of emergency and control, as stated above, we shall have to employ its signals, if we do not have sufficient high frequency stations of the VOR or similar type, and we have to use for the purpose of obtaining the geographic location line, signals of "relative bearing" 202 furnished by navigational equipment which operate by receiving signals from ground radio stations of the ADF type, operating on medium or low frequency.

Moreover, if we wish to have on the screen of the position indicator an image showing the drift by means of a silhouette (ghost) of the moving object, as disclosed in U.S. Patent No. 3,099,008 we require the electronic signals furnished by the Flux Gate 38 type of magnetic compass, or the manual heading system 42.

Since the selection of "heading" 201 signals or "relative heading" 202 signals, and vice-versa, with a view to getting the geographic position lines 205 and 206, is an extremely simple matter, as well as the shifting and the selection of navigational units of high frequency of the VOR type, or low-frequency, ADF type navigation instruments, it is expedient to retain in the computing unit the feasibility of resort to all of these variants, but patently the equipment can be simplified to a considerable degree by eliminating some of these variants, if so desired.

In addition to the consideration herein of U.S. Patent No. 3,099,008, reference is now specifically made to U.S. 3,009,147. This said patent relates to the utilization of signals from range-finding receiver sets 51, commonly referred to as DME (distance measuring equipment), in combination with the continuous radio-location system for aircraft and vessels of U.S. Patent No. 3,099,008.

Figure 2:
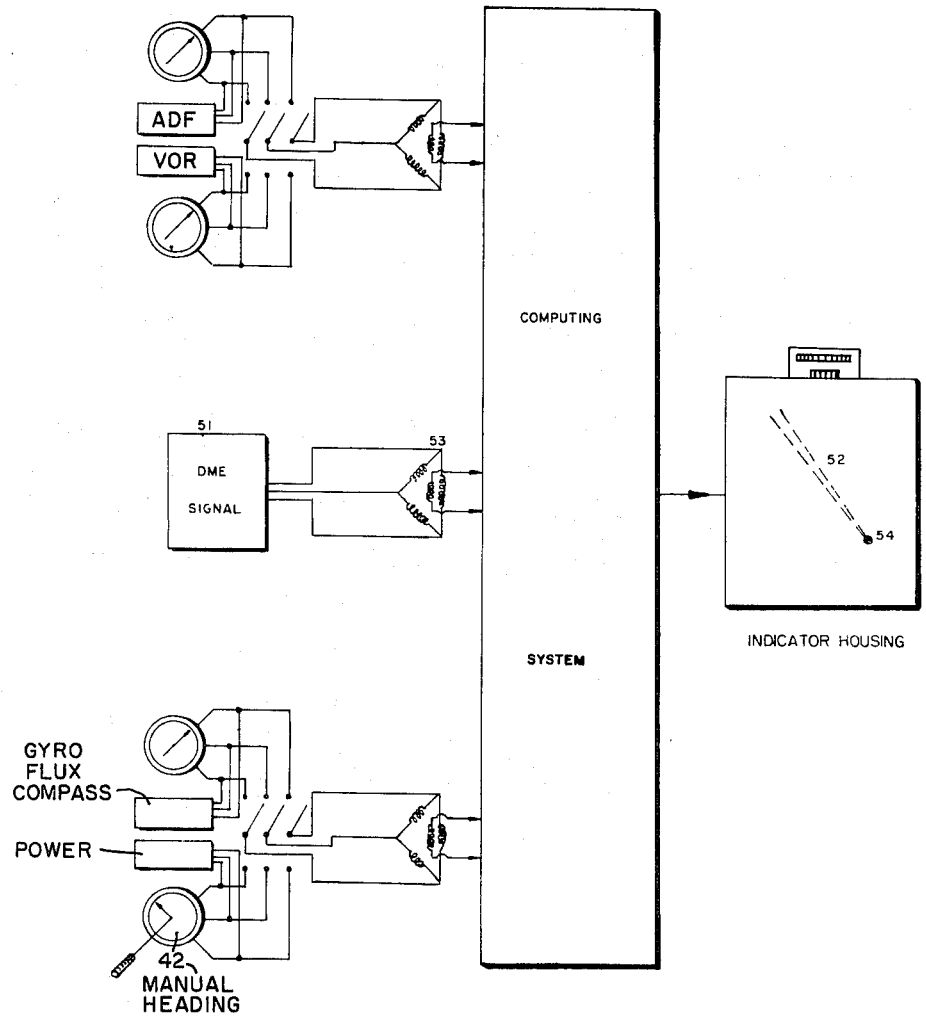
FIG. 2 is a block diagram taken from applicant's U.S. Patent No. 3,009,147 showing the path of signals received from one ground radio station, heading compass signal and distance measuring value to the computing system, with the indicator housing showing the geographical position line as projected on a map.

The fundamental portion of this patent (see FIG. 2) is that the luminous rays 42 are interrupted by the signals of the DME 51, so that the distance intervening between the aircraft or vessel and the ground radio station 54 is given by the length of the ray.

The excerpt in column 7, lines 13-19, of U.S. 3,009,147 reads as follows:

"The motor that is applied to the radioelectrical distance measuring equipments so as to operate the meter or distance indicator, can also work a shutter in such manner that the luminous line that is usually produced by the projection lamp of the equipment, is either lengthened or curtailed in such a manner that it is intersected precisely at the point which, on the plane, actually represents the position of the aircraft."

Figure 8:
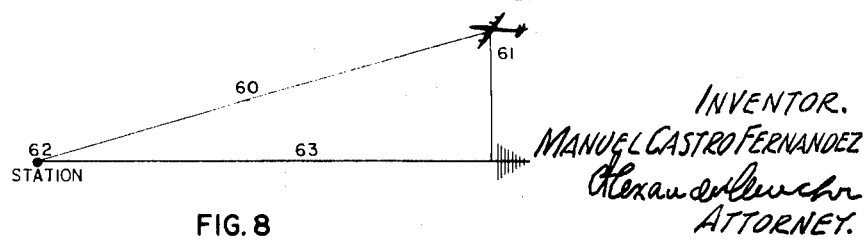
FIG. 8 is a graphic representation of distances.

This interruption of the luminous ray corresponds (FIG. 8) to the exact distance 60 from the plane 61 to the ground point 62 wherein the VOR-DME station is located, and since the latter value varies with the elevation, it is necessary to make the respective computation on the basis of a simple triangle formula, to get the exact distance 63 along the ground.

In theory, all that is required is a ground radio station 207 equipped with a DME for the purpose of determining the position of the plane on the map, since we have the direction of the luminous ray 205 as well as the distance to the ground station, but on the screen this distance must be corrected in accordance with the elevation.

If the plane travels without drift and maintains its heading, the point at which the luminous ray 205 bisects the center line 204 representing the course, marks the position of the craft at that instant. That portion of the luminous ray 209 which tops the center line 204 represents the elevation of the plane. The higher the position of the plane, the larger will be this portion 209 of the luminous ray 205 which overtops the center line 204. Since there is apt to be drift from the course, and since we would be unable to determine it with a single positional line, we will find it necessary to correct the luminous ray 205 interrupted by the DME signal, with the aid of a value corresponding to the elevation of the plane. This can be accomplished in a simple manner by familiar methods, as for example, the use of a graduated scale which is placed above the luminous ray.

Where resort is had to two ground stations, the second one of which may be (210) a VOR station without DME, and even an ADF station, the intersection 208 of the luminous rays 205 and 206 gives the exact position of the moving object, and if the intersection falls outside of the center line 204 which represents the chosen route, we will know that there is drift, and that it is necessary to correct for it, as explained in the foregoing.

When en route, that portion of the luminous ray 209 which corresponds to the DME overtopping the point of intersection, corresponds to the graphic representation of the plane's elevation. When a plane is descending for a landing, the ray 205 interrupted by the DME which overtops the course line 204 will be gradually diminishing until it will no longer overtop the point of intersection 208, which will coincide precisely with the instant of landing.

It is understood that the full disclosure and drawings of U.S. Patent No. 3,099,008 are intended to form part of the instant application under the doctrine of incorporation by reference; and the same intention obtains with respect to the full disclosure and drawings of U.S. Patent No. 3,009,147.

I claim:

1. In a system and device to facilitate navigation based on continuous radio location for aircraft and involving light-beam projection onto a screen type map forming part of an indicator and representing the overflown zone, each of said light beams representing a geographic location line extending from a ground radio station location shown on the map and in a direction to include the position of the craft, the combination of an indicator housing and a screen map forming part of the upper wall thereof for receiving geographic location lines as light-beams and extending from the ground radio station location shown on the map in a direction to include the position of the craft, the said indicator housing having an upper side, and a line marking disposed along the vertical center of the screen as a selective direction to indicate the route which the craft is to follow.

2. The combination of claim 1 wherein the line marking is comprised of a line traced out directly on the map.

3. A system as defined in claim 1 wherein the line marking is comprised of luminous material.

4. In a system and device to facilitate navigation based on continuous radio location for aircraft and involving light beam projection onto a screen type map forming part of an indicator and representing the overflown zone, each of said light beams representing a geographic location line and extending from a ground radio station location shown on the map and in a direction to include the position of the craft, and with the position of the map oriented so that the flight route coincides with a line marking of the indicator, the said geographic location lines being limited in length by DME (distance measuring equipment) signals, the extent of extension of the lines of geographic location beyond the intersection with the indicator line indicating the elevation of the aircraft, each of said extensions becoming larger or smaller depending on the elevation of the aircraft.

5. In a system and device to facilitate navigation based on continuous radio location for aircraft and involving light beam projection onto a screen type map forming part of an indicator and representing the overflown zone, each of said light beams representing a geographic location line extending from a ground radio station location shown on the map in a direction to include the position of the craft, and with the position of the map oriented so that the flight route coincides with a line marking of the indicator, one of said geographic lines being obtained from signals supplied by navigation instruments known as VOR (visual omni-range) or ADF (automatic direction finder) or the like, and the second one obtained in a similar manner but limited by DME (distance measuring equipment) signals, a graphic image of the aircraft elevation being indicated by the extension of said second line from the point of intersection of said two lines of geographic location.

6. The combination of claim 1 wherein the line marking is comprised of a line formed on a glass covering for the map.

7. The combination of claim 1 wherein the line marking is comprised of a wire extending from the top of the indicator housing to the bottom.

8. A system and device as defined in claim 1 wherein said map is so positioned that its orientation in the screen coincides with the terrain over which the flight is taking place, and the line marking disposed along the vertical center of said screen coincides with the flight route on said map.

9. A system and device as defined in claim 1 wherein the geographic location lines indicate the position of the moving object being obtained from radial values known as bearing or angular values furnished by high frequency navigation instruments located at said ground station so that when these values are obtained there is no need for recourse to additional signals obtained from other systems recording the fluctuations of the aircraft's heading.

10. A system and device as defined in claim 9 wherein any deviation of said intersection from said vertical line on the screen indicates drift or other deviation of the craft from the planned route, whereby correction may be made without resort to magnetic compasses, inertia systems or any other systems recording the fluctuations of the aircraft's heading.

(References on following page)

References Cited by the Examiner

UNITED STATES PATENTS

| | | | |
|---|---|---|---|
| 1,977,772 | 10/1934 | Miller | 343—112 |
| 2,462,077 | 2/1949 | Duggar | 343—112 |
| 2,608,094 | 8/1952 | Best | 33—1 X |
| 3,009,147 | 11/1961 | Fernandez | 343—112 |

FOREIGN PATENTS 1,090,392  10/1954  France.

OTHER REFERENCES

I.R.E. Transactions on Aeronautical and Navigational Electronics, vol. ANE 2, No. 3, September 1955, pp. 23–25.

CHESTER L. JUSTUS, *Primary Examiner.*

R. E. BERGER, *Assistant Examiner.*